Nov. 13, 1962 D. B. BULLOCK ETAL 3,064,208

VARIABLE FREQUENCY PULSE GENERATOR

Filed Jan. 5, 1961

INVENTORS D. B. BULLOCK
J. T. COCKER
A. J. RACK
BY R. B. Anderson
ATTORNEY

United States Patent Office
3,064,208
Patented Nov. 13, 1962

3,064,208

VARIABLE FREQUENCY PULSE GENERATOR

Donald B. Bullock, John T. Cocker, and Alois J. Rack, Millington, N.J., assignors to Bell Telephone Laboratories, Incorporated, New York, N.Y., a corporation of New York Filed Jan. 5, 1961, Ser. No. 80,953
4 Claims. (Cl. 332—9)

Figure 1:
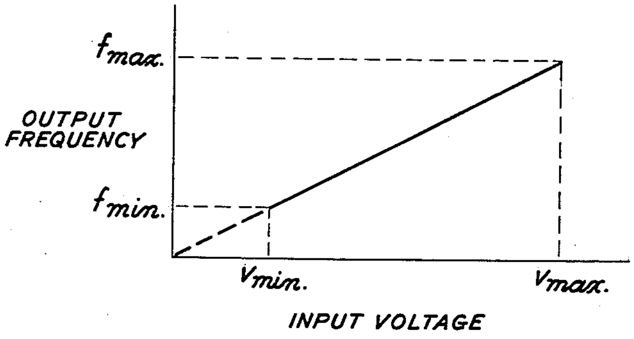

This invention relates to variable-frequency wave generators and more particularly to circuit arrangements for generating pulses at frequencies which vary under the control of the amplitude of an external signal.

It is sometimes desirable to convert a signal which undergoes a succession of variations in instantaneous amplitude into a corresponding wave which undergoes a similar succession of frequency variations. For example, data in binary form may be conveniently transmitted over a telephone line if it is first transformed into a wave that shifts between two predetermined frequencies which represent the respective marks and spaces. It is also sometimes desirable in other applications to generate trains of pulses whose repetition rate is a linear function of an applied direct-current voltage, and to vary the repetition rate by varying the magnitude of the direct-current voltage applied to the generator.

In the past one technique for achieving the above results has been through the use of free running multivibrators, as it is often possible to control the output frequency of a free running multivibrator in a generally linear manner by superimposing the incoming signal of varying amplitude upon one or more of the principal biasing voltages of the multivibrator. This technique, however, has two disadvantages. First, the results obtained are not satisfactory enough for all purposes in that the output frequency is not related to the input voltage in as linear a manner as may be desired. Secondly, when this technique is applied to transistorized multivibrators it is found to introduce serious nonlinearities into the control of the output frequency. The solution of the latter problem, in order to make use of these multivibrator techniques in transistorized circuitry, has required relatively complex additional circuitry.

A principal object of this invention therefore is to generate pulse trains whose repetition rate bears a more linear relation to an applied direct-current voltage than is obtainable by prior art devices.

Another object of this invention is to eliminate the need for a multivibrator in a variable frequency pulse generating circuit.

A related object of this invention is to eliminate the need for relatively complex circuitry in order to generate pulse trains of varying frequency using transistorized apparatus.

In accordance with this invention a control voltage charges a capacitor and a high gain amplifier generates a pulse when the capacitor voltage exceeds a predetermined threshold level, with the output pulse from the amplifier being used to discharge the capacitor while a voltage indicative of the discharge current through the capacitor is fed to the amplifier to sustain the output pulse until the capacitor is fully discharged and a positive feedback path between the amplifier output and the input of the threshold determining device is provided to insure stability of starting. Transistorized circuitry may be employed, as the circuitry is relatively insensitive to changes in operating parameters.

Figure 2:
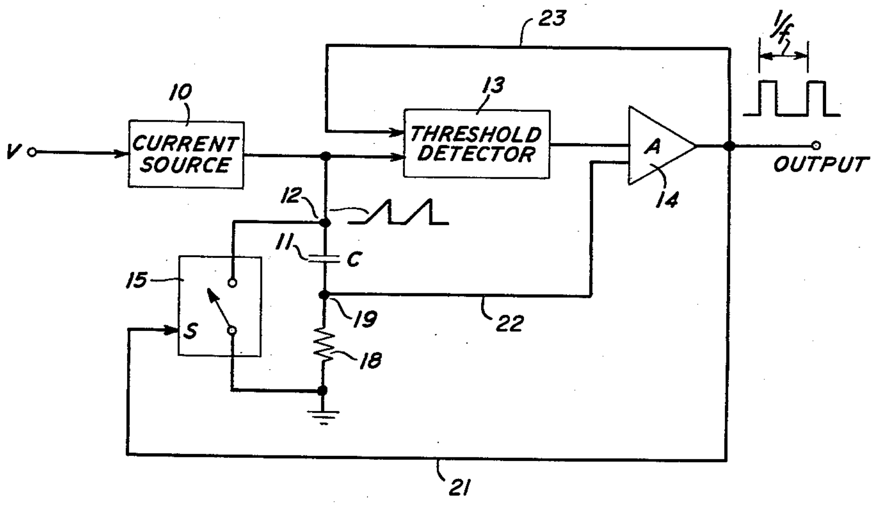

The invention will be more fully comprehended from the following detailed description taken in conjunction with the drawings in which:

FIG. 1 shows the relationship between the output frequency and the input voltage; and FIG. 2 is a block diagram of a circuit embodying the invention.

The desired linear relationship to be obtained between the direct-current input voltage, V, and the output frequency $f$ is shown in FIG. 1. In accordance with this invention this result is obtained, as shown in FIG. 2, by applying the input voltage, V, to a high output impedance current source 10 which generates currents directly proportional to V and charges a capacitor 11. The current source 10, is, for example, a transistor whose emitter is connected to the input voltage, V, by means of a resistor, and whose base is biased at a voltage higher than the voltage at the collector output terminal connected to capacitor 11. The voltage between the upper terminal 12 of the capacitor 11 and ground is applied to a threshold detector 13 which conducts when a predetermined threshold level is exceeded. The threshold detector is, for example, a diode biased to conduct only when a particular predetermined voltage is applied to it. The output of the threshold detector 13 is applied to a high gain amplifier 14 which amplifies the initial output of the detector to a very steep wavefront and then due in part to the positive feedback feature, discussed below, saturates at a constant voltage output when the output of the threshold detector 13 increases beyond its initial value. In accordance with a feature of the invention the output voltage from amplifier 14 is fed back by means of feedback path 21 to a switch 15 connected between the upper terminal 12 of capacitor 11 and ground. The switch 15, which is shown in block diagram form in FIG. 2, is preferably an electronic switch, an example of which is that shown in FIG. 4–31 on page 130 of Pulse and Digital Circuits by Millman and Taub, published by McGraw-Hill Book Company, Incorporated, 1956. The output voltage from the amplifier closes switch 15 and discharges capacitor 11 through resistor 18 connected between the lower terminal 19 of the capacitor and ground. In accordance with a feature of the invention, a voltage taken across the resistor 18 at terminal 19 is applied by means of a connecting path 22 to a biasing point of amplifier 14 so that amplifier 14 will continue to generate the maximum output voltage it is capable of delivering until current ceases to flow in resistor 18 indicating that the capacitor 11 is fully discharged. This feature of the invention insures that the output voltage during both the period of time that the threshold detector is conducting and the time following when the capacitor is discharging is a constant voltage. When the capacitor is fully discharged the amplifier output returns to its initial voltage, switch 15 opens and the process repeats itself. The interval of time between the end of one output pulse and the beginning of the succeeding output pulse is determined by the time it takes the charge on the capacitor 11 to build up to a voltage which just exceeds the threshold voltage of the detector 13. The width of each pulse is determined by the time required for the capacitor to completely discharge from the threshold voltage. Accordingly, since the time it takes the capacitor to charge up to a given threshold level is a function of the current supplied to the capacitor, and since the latter is a linear function of the applied input voltage, V, the relationship shown in FIG. 1 is obtained. The maximum frequency, $f_{max.}$, obtainable is that frequency at which the discharge time of the capacitor becomes a significant portion of the period. The linear relationship shown in FIG. 1 is not maintained above such frequencies. The minimum frequency obtainable, $f_{min.}$, is governed by the ability of the particular threshold detector 13 to detect small voltages across capacitor 11 and resistor 18.

In accordance with a feature of this invention a positive feedback path is applied from the amplifying output to the input of the threshold detector by means of a positive feedback path 23. When the apparatus is first turned on, the closed loop from the amplifier output through the threshold detector to the amplifier input assures proper starting. This result is assured although the buildup in voltage across capacitor 11 might be at such a slow rate as to be insufficient to be transmitted through a capacitive coupled amplifier to assure proper starting, since current will flow through the detector when the threshold level is exceeded, regardless of the rate of build-up of charge. This current flow will produce a slight output voltage from the amplifier which will, as a result of the positive feedback, cause a build-up in output voltage which will cause switch 15 to close and start the generation of output pulses.

It is to be understood that the above-described arrangements are illustrative of the application of the principles of the invention. Numerous other arrangements may be devised by those skilled in the art without departing from the spirit and scope of the invention.

What is claimed is:

1. A variable frequency pulse generator comprising, in combination, a source of input voltage, a capacitor and a resistor connected in series across said voltage source, means to detect the voltage across said series combination of said resistor and said capacitor, an amplifier activated by said detection means when said voltage across said resistor and said capacitor exceeds a predetermined level, a positive feedback path between the output of said pulse generator and the input of said detection means, a switch connected across the series combination of said resistor and said capacitor, means connected between said switch and said amplifier to close said switch and discharge said capacitor when said amplifier produces an output voltage, and a path from the connection between said resistor and said capacitor to said amplifier to cause said amplifier to generate an output as long as said capacitor is not discharged, whereby the frequency at which pulses are generated is directly proportional to said input voltage.

2. A variable frequency pulse generator comprising, in combination, a source of input voltage, a capacitor and a resistor connected in series across said voltage source, means to detect the voltage across said series combination of said resistor and said capacitor, an amplifier activated by said detection means when said voltage across said resistor and said capacitor exceeds a predetermined level, a positive feedback path between the output of said pulse generator and the input of said detection means to insure the generation of output pulses, a switch connected across the series combination of said resistor and said capacitor, means connected between said switch and the output of said amplifier to close said switch and discharge said capacitor when said amplifier produces an output voltage, and a path from the connection between said resistor and said capacitor to said amplifier to cause said amplifier to generate an output as long as said capacitor is not fully discharged, whereby the frequency at which pulses are generated is directly proportional to said input voltage.

3. Apparatus for generating a pulse train having a repetition rate determined by the amplitude of an external signal comprising a timing capacitor and a resistor connected in series, means for changing the potential across said series combination of said timing capacitor and said resistor from a first predetermined voltage level to a second predetermined voltage level at a rate determined by the amplitude of said external signal, detection means to detect when the potential across said series combination of said capacitor and resistor reaches said second predetermined level, generating means activated by said detection means to generate a constant amplitude voltage when said second predetermined voltage level is reached, means for returning said potential across said series combination of said capacitor and said resistor to said first level upon the generation of said output voltage by said generator, means to sustain said generator output voltage until said first level is reached, and positive feedback means connected between the output of said generating means and the input of said detection means to insure the generation of output pulses.

4. Apparatus for generating a train of pulses having a repetition rate determined by the amplitude of an external signal comprising a timing capacitor and a resistor connected in series, a high impedance source for changing the potential across said series combination of said timing capacitor and said resistor from a first predetermined voltage level to a second predetermined voltage level at a rate linearly determined by the amplitude of said external signal, detection means to detect when the potential across said series combination of said capacitor and resistor reaches said second predetermined level, an amplifier activated by said detection means to generate a pulse when said second predetermined voltage level is reached, switching means for returning said potential across said series combination of said capacitor and said resistor to said first level upon the generation of said pulse by said amplifier, means to sustain said pulse output until said first level is reached, and positive feedback means connected between the output of said amplifier and the input of said detection means to insure the generation of output pulses.

References Cited in the file of this patent

UNITED STATES PATENTS

| | | |
|---|---|---|
| 2,500,536 | Goldberg | Mar. 14, 1950 |
| 2,824,287 | Green et al. | Feb. 18, 1958 |